United States Patent [19]
Matos

[11] Patent Number: 5,764,500
[45] Date of Patent: Jun. 9, 1998

[54] SWITCHING POWER SUPPLY

[75] Inventor: Brian A. Matos, Trumbull, Conn.

[73] Assignee: Northrop Grumman Corporation, Los Angeles, Calif.

[21] Appl. No.: 999,538

[22] Filed: Dec. 31, 1992

Related U.S. Application Data

[63] Continuation of Ser. No. 706,500, May 28, 1991, abandoned.

[51] Int. Cl.⁶ ............................ H02M 7/5387; H02M 3/335
[52] U.S. Cl. ........................ 363/132; 363/17; 363/98; 323/331; 323/334
[58] Field of Search .................. 363/17, 98, 131, 363/132, 56; 323/250, 251, 253, 331, 332, 334; 336/183, 184, 232, 178

[56] References Cited

U.S. PATENT DOCUMENTS

| | | | |
|---|---|---|---|
| 4,199,807 | 4/1980 | Crowe et al. | 363/132 |
| 4,519,022 | 5/1985 | Glennon | 363/41 |
| 4,635,179 | 1/1987 | Carsten | 363/70 |
| 4,691,270 | 9/1987 | Pruitt | 363/56 |
| 4,761,727 | 8/1988 | Kammiller | 363/98 |
| 4,766,365 | 8/1988 | Bolduc et al. | 336/178 |
| 4,802,078 | 1/1989 | Hill | 363/56 |
| 4,803,609 | 2/1989 | Gillett et al. | 363/17 |
| 4,823,250 | 4/1989 | Kolecki et al. | 363/71 |
| 4,864,479 | 9/1989 | Steigerwald et al. | 363/98 |
| 4,901,216 | 2/1990 | Small | 363/132 |

*Primary Examiner*—Adolf Berhane
*Attorney, Agent, or Firm*—Walter G. Sutcliff

[57] ABSTRACT

A switching power supply (30) uses a transformer 37 having a first primary winding (38A) and a second primary winding (38B) wrapped around the same core (52, 53) but wrapped around opposite sides of the core (52, 53). One of the ends from each of a pair of secondary windings (61, 62) are electrically connected together to form a conventional transformer center tap and the remaining ends of the secondaries (61, 62) become conventional transformer end taps.

4 Claims, 2 Drawing Sheets

SWITCHING POWER SUPPLY

The parent application is Ser. No. 07/706,500 filed May 28, 1991 now abandoned.

TECHNICAL FIELD

This invention relates to the field of switching power supplies.

BACKGROUND ART

A switching power supply, having a DC input voltage signal, uses one or more switches to synthesize an AC voltage signal which can be provided to the primary winding of a transformer. The secondary of the transformer has three leads extending therefrom, one lead from each end of the secondary winding (end taps) and one lead connected to the midpoint of the secondary winding (center tap). For providing DC to DC conversion capability, the end taps and the center tap can be connected to a conventional AC to DC conversion circuit, known to those skilled in the art, which rectifies the AC voltage signal and averages the rectified signal into a DC voltage signal.

Referring to FIG. 1, a switching power supply 10, known in the prior art, is provided with power from a source having a positive DC voltage input +VIN, and a negative DC voltage input −VIN. The supply 10 has four switches 12–15 and a transformer 17 having a primary winding 18. The switches 12–15 can be implemented using MOSFET semiconductor transistors. Control means (not shown) provide control signals to turn the switches 12–15 ON (i.e. closed) and OFF (i.e. open).

Simultaneously turning ON the switches 12, 15 while turning OFF the switches 13, 14 causes a first voltage signal (having a magnitude of +2VIN) to be provided across the primary 18. Simultaneously turning ON the switches 13, 14 while turning OFF the switches 12, 15 causes a second voltage signal (having a magnitude of −2VIN), having an opposite sense from the first voltage signal, to be provided across the primary 18. The control means alternatively turns the first and fourth switches 12, 15 ON and then OFF and then turns the second and third switches 13, 14 ON and then OFF, thus providing an AC voltage signal to the primary winding 18.

A plurality of diodes 20–23 are each connected in parallel with each of the switches 12–15, respectively, in order to compensate for transient current resulting from repeatedly turning the switches 12–15 ON and OFF. The diodes 20–23 provide a current path back to the source when all of the switches 12–15 are OFF. The diodes 20–23 can be discreet electronic parts or can be an inherent characteristic of the MOSFET switches 12–15.

Under certain conditions, such as exposure to externally generated momentary high intensity energy irradiation, all of the MOSFET switches 12–15 can all become turned ON at the same time, thereby causing a short circuit across the source. An inductor 28, placed in series between the +VIN and −VIN signals, protects against this condition by providing an AC impedance across the source inputs. A diode 29, connected in parallel with the inductor 28, is used during normal operations to provide a path back to the source (around the inductor 28) for transient currents which occur when the switches 12–15 are repeatedly turned ON and OFF.

It is desirable to decrease the size of the transformer 17. The size of the transformer 17 can be decreased as the frequency of operation of the power supply 10 is increased. However, the effective impedance of the inductor 28 increases as the frequency of operation increases, thereby interfering with normal operation of the power supply 10. Removing or substantially decreasing the inherent impedance of the inductor 28 will eliminate or decrease the protection against all of the switches 12–15 being turned ON by externally generated momentary high intensity energy irradiation.

DISCLOSURE OF INVENTION

Objects of the invention include a switching power supply capable of being operated at high frequencies having provision for protection against externally generated momentary high intensity energy irradiation.

According to the present invention, a switching power supply uses voltage transformation means having a first input and having a second input electrically separated from said first input, wherein alternatively a first voltage signal is applied to said first input and a second voltage signal is applied to said second input to produce an output AC voltage signal. According further to the present invention, a voltage transformer has first primary and secondary windings and second primary and secondary windings wrapped around the same core wherein said first primary and secondary windings are intertwined for maximum coupling, said second primary and secondary windings are intertwined for maximum coupling, and said first and second primary windings are located on opposite sides of the core in order to maximize leakage inductance between the primary windings.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

Figure 2:
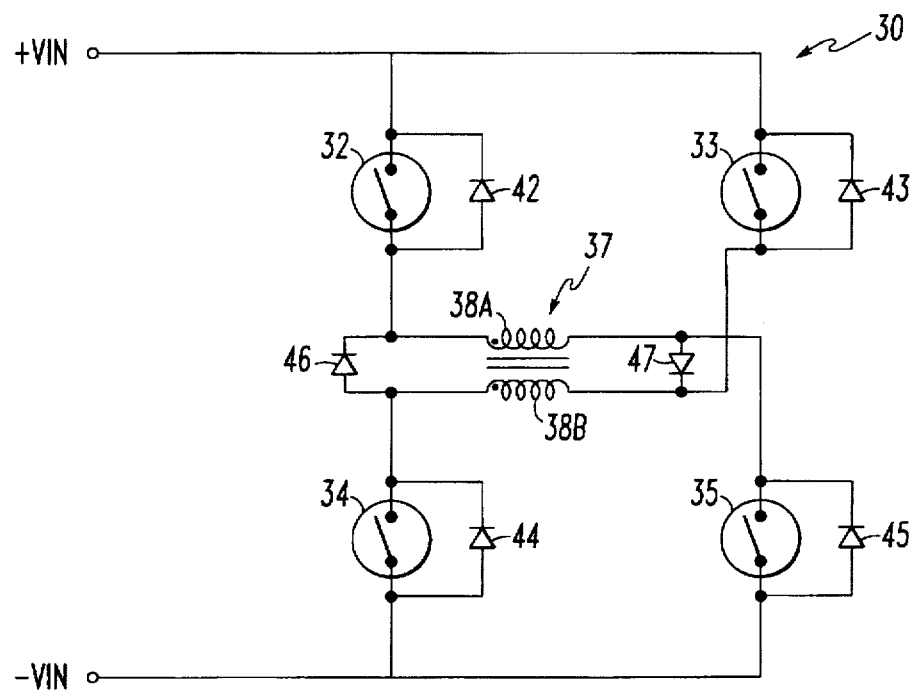
FIG. 2 is a schematic diagram of a switching power supply according to the invention.

Referring to FIG. 2, a switching power supply 30 is provided with power from a source having a positive DC voltage input +VIN, and a negative DC voltage input −VIN. The supply 30 has a first switch 32, a second switch 33, a third switch 34, and a fourth switch 35, which are all implemented using MOSFET semiconductor transistors, such as MOSFET transistors part #IRF840 manufactured by International Rectifier Corp. of El Segundo, Calif. The power supply 30 is further comprised of a transformer 37 having first and second inputs in the form of a first primary winding 38A and a second primary winding 38B, respectively. The windings 38A, 38B are wrapped around the same core, but are electrically separated (i.e. there is no DC electrical path within the transformer 37 between the first winding 38A and the second winding 38B). The transformer 37 and the windings 38A, 38B are discussed in more detail hereinafter.

Control means (not shown), known to those skilled in the art, provide control signals to turn the switches 32–35 ON and OFF. Simultaneously turning ON the first and fourth switches 32, 35 while turning OFF the second and third switches 33, 34 causes a first voltage signal (having a magnitude of +2VIN) to be provided across the first primary winding 38A. Simultaneously turning ON the second and third switches 33, 34 while turning OFF the first and fourth switches 32, 35 causes a second voltage signal (having a magnitude of -2VIN), having an opposite sense of the first voltage signal, to be provided across the second primary winding 38B.

The control means alternatively turns the first and fourth switches 32, 35 ON and then OFF and then turns the second and third switches 33, 34 ON and then OFF, thus providing an AC voltage signal to the primary windings 38A, 38B. The exact timing and duration of the ON and OFF signals depend upon a variety of functional factors known to those skilled in the art (see, for example, Goodenough, "Phase Modulation Cuts Large-Switcher Losses", *Electronic Design*, Apr. 25, 1991, page 39).

A plurality of diodes 42–47 provide a path back to the source for transient currents which result from repeated switching and which are present when all of the switches 32–35 are OFF. The diodes 46, 47 across the primaries 38A, 38B are discreet circuit elements, such as part number SDR1306 manufactured by Solid State Devices Inc. of La Mirada, Calif. The other diodes 42–45 represent an inherent characteristic of the particular MOSFET transistor devices used to implement the switches 32–35 and hence for the embodiment shown are not discreet devices.

Subjecting the power supply 30 to externally generated momentary high intensity energy irradiation would cause all of the switches 32–35 and all of the diodes 42–47 to turn ON momentarily. The diodes 42–47 will turn OFF in a relatively short amount of time so as not to short circuit, and hence damage, the source. The switches 32–35, on the other hand, will stay ON a relatively longer amount of time. However, unlike the power supply 10 of FIG. 1, the only direct electrical path from the +VIN input to the -VIN input is through the primaries 38A, 38B, which are electrically separated. Furthermore, each of the primaries 38A, 38B provides a series leakage inductance between the inputs to protect the power supply 30 in a manner similar to the protection provided by the inductor 28 used in the power supply 10 of FIG. 1.

Figure 1:
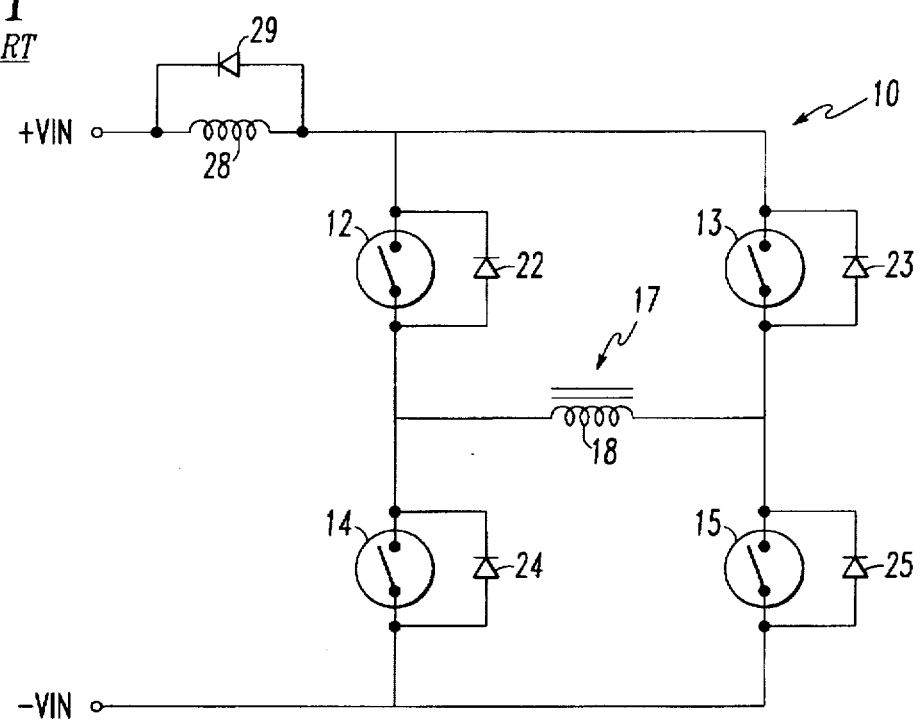
FIG. 1 is a schematic diagram of a prior art switching power supply.

Note that the protection against externally generated momentary high intensity energy irradiation for the power supply 30 is provided without the high frequency inductive losses of the power supply 10 of FIG. 1. Under normal operating conditions, the power supply 30 can be operated at high speed, typically 0.5 MEGAHERTZ, because the +VIN and -VIN inputs are coupled through the switches 32–35 directly to the inputs of the transformer 37.

Figure 3:
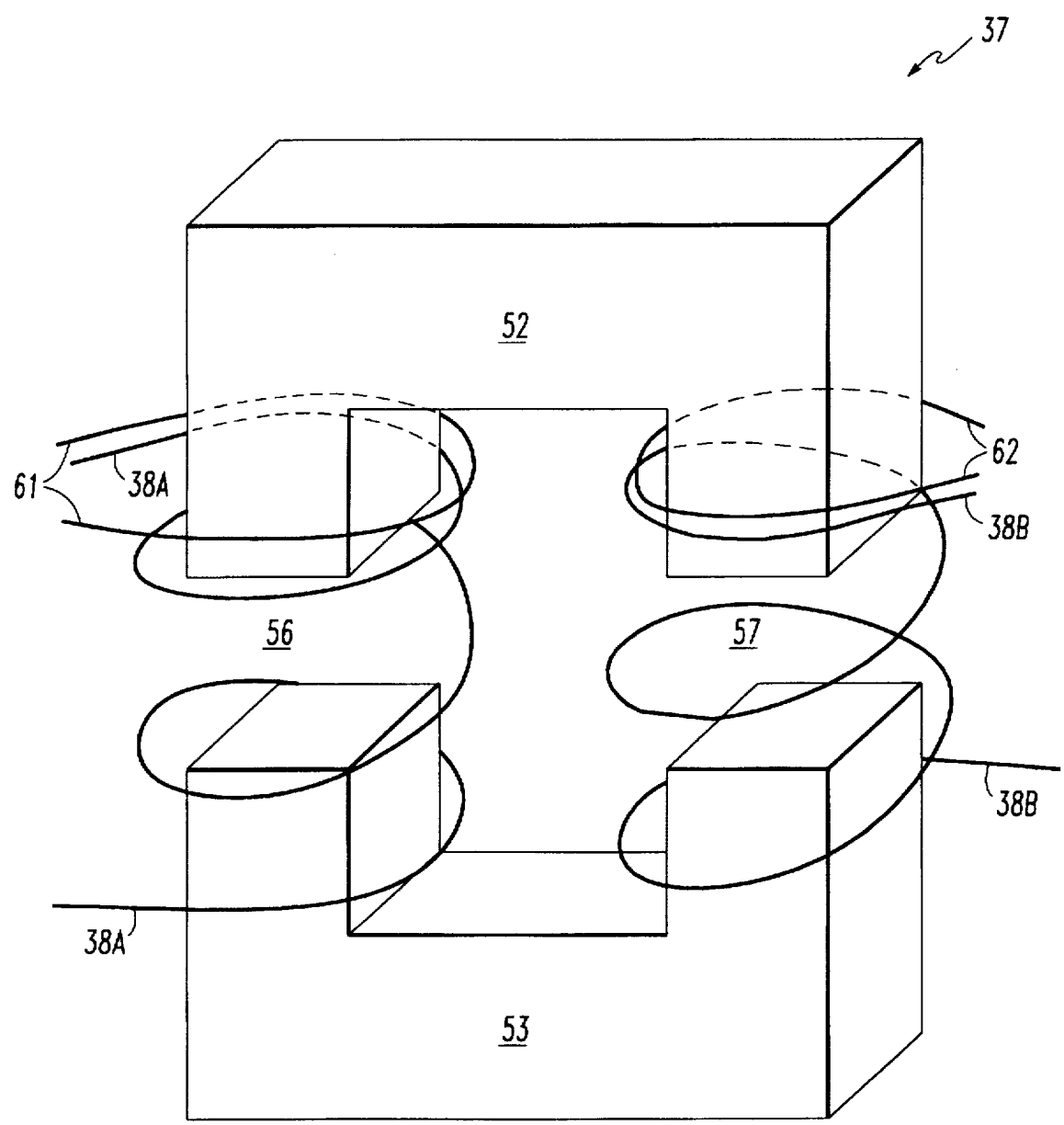
FIG. 3 is a perspective view of a transformer having two primary windings.

Referring to FIG. 3, the core of the transformer 37 is comprised of a first core half 52 and a second core half 53 which are separated by air gaps 56, 57 for storing magnetic energy flowing through the core halves 52, 53. The core is made of a high frequency ferrite material, such as 3F3, manufactured by Ferroxcube Corp. of Saugerties, N.Y. and measures 1.125 inches by 1.125 inches on the outside. The square cross sections of the core halves 52, 53 measure 0.25 inches on each side. The length of the air gaps is 0.002 inches.

The first primary winding 38A is wound around a first side of the first and second core halves 52, 53 and spans the air gap 56. Similarly, the second primary winding 38B is wound around a second side of the first and second core halves 52, 53 and spans the air gap 57. The primaries 38A, 38B are comprised of six twentysix gauge copper wires, connected in parallel, and are each wound a total of twenty turns around the core halves 52, 53. The primaries 38A, 38B are wound on opposing sides of the core halves 52, 53 in order to minimize coupling and to provide a substantial amount of leakage inductance between the primaries 38A, 38B.

A first secondary 61 and a second secondary 62, both comprised of two flat copper ribbons, connected in parallel, measuring 0.25 inches wide by 0.031 inches thick, are each wound a single turn on the first core half 52 and intertwined with the first primary 38A and the second primary 38B, respectively. Intertwining maximizes the coupling between the first primary 38A and the first secondary 61 and the coupling between the second primary 38B and the second secondary 62. One of the ends from each of the secondaries 61, 62 are electrically connected together to form a conventional transformer center tap and the remaining ends of the secondaries 61, 62 become conventional transformer end taps. The output AC voltage signal from the end and center taps can be converted to a DC voltage signal by using a conventional voltage rectifier, such as part number OM4204SS from Omnirel Corp. of Leominster, Mass.

The power supply 30 of FIG. 2 can also be implemented by using two separate transformers in place of the transformer 37 shown, in which case the secondaries will be combined in a manner similar to that described herein for the transformer 37 of FIG. 3, except that a diode may be connected in series with the center tap in order to compensate for any electrical or magnetic dissimilarities between the separate transformers. Furthermore, the separate transformers can be integrated onto a single core by means known to those skilled in the art, wherein the primaries and secondaries share a common section of the core thereby magnetically isolating each transformer from the other.

The invention can be practiced using other types of voltage transformation means, other types of current directing means, and other switching means known to those skilled in the art. Other switching means include, but are not limited to, other types and brands of MOSFET transistors, bipolar transistors, and relays. The dimensions, construction material, geometry, length or use of the air gaps 56, 57, numbers of primary winding 38A, 38B and/or secondary winding 61, 62 turns, or wire types, used for the transformer 37 can be varied by a variety of functional factors, known to those skilled in the art, without departing from the spirit and scope of the present invention.

The diodes 42–47, which are used to direct transient currents, can be eliminated without departing from the spirit and scope of the present invention. Although the diodes 42–45 represent an inherent characteristic of the particular MOSFET transistors used to implement the switches 32–35, discreet diodes could be used instead. The invention may be practiced irrespective of the magnitudes of the input DC voltage signals, +VIN and -VIN, so long as +VIN does not equal -VIN. One of the signals may even have a magnitude of zero. Similarly, the invention can be practiced irrespective of the desired magnitude of the output AC voltage signal.

Although the invention has been shown and described with respect to exemplary embodiments thereof, it should be understood by those skilled in the art that various changes, omissions and additions may be made therein and thereto, without departing from the spirit and the scope of the invention.

What is claimed is:

1. A switching power supply, comprising:
voltage transformation means, having a transformer with a first core half and a second core half separated by an air gap, a first primary winding wrapped around a first side of both said first and second core halves, a second primary winding wrapped around a second side of both said first and second core halves, such that said first and second primary windings are electrically isolated from one another, said transformation means for providing an AC voltage signal on a secondary winding in response to first and second DC voltage signals alternatively being applied to said first primary winding and said secondary primary winding; and switching means, for alternatively providing said first and second DC voltage signals to said first primary winding and to said second primary winding comprising:
- a first switch and a fourth switch, for providing said first DC voltage signal to said first primary winding; and
- a second switch and a third switch, for providing said second DC voltage signal to said second primary winding.

2. A switching power supply, according to claim 1, wherein said each of said switches further comprises a diode connected in parallel with each of said switches.

3. The switching power supply of claim 2, further comprising:
- a pair of diodes interposed between said first and second primary windings, such that the cathode of the first diode is connected to said first primary winding, and the cathode of the second diode is connected to said second primary winding.

4. A switching power supply, according to claim 3, wherein said switches are provided by a MOSFET transistors.

* * * * *